United States Patent [19]

Drescher et al.

[11] Patent Number: 4,631,456
[45] Date of Patent: Dec. 23, 1986

[54] INERTIAL ENERGY STORAGE DEVICE AND SYNCHRONOUS ROTARY ELECTRICAL MACHINE FOR USE THEREIN

[75] Inventors: Robert D. Drescher, Cambridge; David B. Eisenhaure, Hull; Richard L. Hockney, Saugus, all of Mass.; Bruce G. Johnson, Sacramento, Calif.; Emery St. George, Jr., Duxbury; David C. Whipple, Cohasset, both of Mass.

[73] Assignee: The Charles Stark Draper Laboratory, Inc., Cambridge, Mass.

[21] Appl. No.: 651,071

[22] Filed: Sep. 17, 1984

Related U.S. Application Data

[63] Continuation of Ser. No. 360,410, Mar. 22, 1982, abandoned.

[51] Int. Cl.⁴ .......................... H02K 47/14; H02K 7/02
[52] U.S. Cl. ..................................... 318/140; 318/150; 318/161; 310/74; 310/113; 310/153
[58] Field of Search ............... 318/140, 150, 161, 254; 322/4; 310/74, 153, 154, 113, 145, 156, 162, 164

[56] References Cited

U.S. PATENT DOCUMENTS

| | | | |
|---|---|---|---|
| 3,158,750 | 11/1964 | Roses | 318/415 X |
| 3,548,965 | 12/1970 | Pierro | 310/74 X |
| 3,569,804 | 3/1971 | Studer | 318/138 |
| 4,077,678 | 3/1978 | Studer et al. | 310/154 X |
| 4,179,729 | 12/1979 | Stanton et al. | 322/4 X |
| 4,321,478 | 3/1982 | Plunkett et al. | 318/150 X |
| 4,355,249 | 10/1982 | Kenwell | 310/49 R |
| 4,358,719 | 11/1982 | Currier et al. | 318/150 X |

Primary Examiner—William M. Shoop, Jr.
Assistant Examiner—Bentsu Ro
Attorney, Agent, or Firm—Joseph S. Iandiorio; William E. Noonan

[57] ABSTRACT

An inertial energy storage device including a synchronous rotary electrical machine for bidirectional conversion between mechanical and electrical energy including: a stator having two axially spaced sets of circumferentially spaced teeth; field excitation means disposed on the stator to provide an axially polarized magnetic field; stator windings including a plurality of coils, each of which surrounds at least one tooth from each set; and a rotor having a plurality of circumferentially spaced teeth facing the stator teeth, and a circumferential flywheel mass radially spaced from its rotational axis; and a motor control circuit including sensor means for sensing the position of the rotor relative to the stator; means, responsive to the sensor means, for generating a waveform for driving the machine when it is operating as a motor; a voltage control circuit for controlling the amplitude of the waveform for driving the machine; and a current control circuit for controlling amplitude of the current provided to the machine.

47 Claims, 19 Drawing Figures

FIG. 6 FLUX THRU UPPER STATOR TEETH $A_1, A_2$ & $A_3$

FIG. 7 FLUX THRU LOWER STATOR TEETH $A'_1, A'_2$ & $A'_3$

FIG. 8 FLUX THRU STATOR TEETH $A_2$ & $A'_2$

FIG. 9 FLUX IN TEETH $A_1, A_2, A_3, A'_1, A'_2$ & $A'_3$ AND SURROUNDING STATOR COIL.

FIG. 10 VOLTAGE AT TERMINAL ΦA OF STATOR WINDING.

INERTIAL ENERGY STORAGE DEVICE AND SYNCHRONOUS ROTARY ELECTRICAL MACHINE FOR USE THEREIN

This application is a continuation of application Ser. No. 360,410, filed Mar. 22, 1982, now abandoned.

FIELD OF INVENTION

This invention relates to an inertial energy storage device, and more particularly to a synchronous rotary electrical machine for bidirectional conversion between mechanical and electrical energy and a motor control circuit for driving that machine used in such a device.

BACKGROUND OF INVENTION

Motor/generator devices are often used in conjunction with a flywheel to perform the function of power supplies for electrical apparatus. An external power source is utilized to drive the flywheel up to speed. Upon disconnection of the power, the flywheel drives the device as a generator to produce the electrical power output. One conventional motor/generator is a brush type d.c. motor which uses a permanent magnet or wound coil for field excitation and a wound rotor armature. For operation as a generator the field power is raised so that the generator voltage exceeds the load voltage.

Among the shortcomings of such devices are the limited life of the brushes and the added resistance that the brushes introduce. Other problems derive from the centrifugal force developed on the rotor which stresses and may tend to destroy the winding and commutator. Often the armature is made small to avoid destructive centrifugal forces; in that case a separate flywheel is needed.

Also used are brushless permanent magnet rotor machines, which rotate the field to develop the torque for motor operation and drop the field excitation for generator operation. But permanent magnets are typically brittle, hard to machine and have poor tensile strength so they may fly apart under sufficient centrifugal force. The adhesive that holds the magnets is likewise affected by centrifugal force. The energy that can be inertially stored in a material used as a flywheel or rotor is limited by the yield strength of the material and the yield strength of permanent magnet material is low.

SUMMARY OF INVENTION

It is therefore an object of this invention to provide an improved inertial energy storage device.

It is a further object of this invention to provide such a device which utilizes a synchronous rotary electrical machine for bidirectional conversion between mechanical and electrical energy and a motor control circuit for operating the synchronous rotary electrical machine when functioning as a motor in the inertial energy storage device.

It is a further object of this invention to provide an improved synchronous rotary electrical machine for bidirectional conversion between mechanical and electrical energy.

It is a further object of this invention to provide such a machine which is simple, uses no brushes or commutator, and is not limited by the effects of centrifugal force on windings or permanent magnet material.

It is a further object of this invention to provide such a machine which operates selectively both as a generator and a motor.

It is a further object of this invention to provide such a machine whose rotor may incorporate an integral flywheel.

The invention results from the realization that a simple, reliable inertial energy storage device can be constructed from a synchronous rotary electrical motor/generator machine made with permanent magnet or other field excitation device disposed on the stator with stator coils wound about at least one tooth from each set, that the machine can be driven as a motor using a motor control circuit, and that a flywheel mass may be incorporated in the rotor.

The invention features an inertial energy storage device including a synchronous rotary electrical machine and a motor control circuit for operating the machine as a motor. The invention also features a synchronous rotary electrical machine for bidirectional conversion between mechanical and electrical energy, i.e., operation as either a motor, a generator, or both. There is a stator having two axially spaced sets of circumferentially spaced teeth, and field excitation means are disposed on the stator to provide an axially polarized magnetic field. Stator windings include a plurality of coils each of which surrounds at least one tooth frm each set. In the particular embodiment illustrated hereinafter, each coil surrounds three teeth from each set. In general, the number of teeth surrounded by a coil depends on the number of phases, the number of slots and the winding pitch. A rotor is provided which has a plurality of circumferentially spaced teeth facing the stator teeth.

In preferred embodiments, the rotor is external to the stator and may include a circumferential flywheel mass radially spaced from the rotational axis. Field excitation means may include a permanent magnet or a field winding, or both. In one arrangement, the teeth of one of the sets of teeth on the stator are offset with respect to the teeth of the other set on the stator, and the teeth on the rotor may be either in one set or in two axially spaced sets but aligned with each other. Conversely, the plurality of teeth on the rotor may include two axially spaced sets of circumferentially spaced teeth, and the teeth of one of the sets on the rotor may be offset with respect to the teeth of the other set on the rotor, while the two sets of teeth on the stator are aligned with each other.

Rectifier means may be provided with the machine for converting the AC output of the stator windings to DC when the machine is operated as a generator. The motor control circuit may include a sensor means for sensing the position of the rotor relative to the stator and means, responsive to the sensor means, for generating a waveform for driving the machine as a motor. The motor control circuit may also include a voltage control circuit for controlling the amplitude of the waveform for driving the machine as a motor, and a current control circuit for controlling the amplitude of the current provided to the machine operating as a motor. The sensor means may include an optical sensor.

The means for generating a waveform may include a signal generator and a phase detector, responsive to the sensor means and the signal generator, for keeping the signal generator output in phase with the output from the sensor means. The signal generator may include a voltage-controlled oscillator and the means for generating a waveform may also include a switching circuit driven by the output of the signal generator. The means for generating a waveform may also include a starter circuit for initially driving the signal generator and switching means for supplying the input of the switching generator with the output from either the starter circuit or the phase detector circuit. Detector means operate the switching means to connect the phase detector to the switching generator and disconnect the starter circuit when the phase detector first detects a phase null. The voltage control circuit may include a frequency detector for comparing the frequency of the output from the sensor means with the maximum frequency of the machine and providing a signal indicative thereof to adjust the amplitude of the input to the machine. The current control circuit may include current sensor means for sensing the current flowing in the stator windings and means, responsive to the current sensor means, for adjusting the current supplied to the machine.

DISCLOSURE OF PREFERRED EMBODIMENT

Other objects, features and advantages will occur from the following description of a preferred embodiment and the accompanying drawings, in which.

The invention may be accomplished in an inertial energy storage device which uses a synchronous rotary electrical machine for bidirectional conversion between mechanical and electrical energy. The rotary machine includes a stator having two axially spaced sets of circumferentially spaced teeth and field excitation means on the stator to provide an axially polarized magnetic field. Stator windings include a plurality of coils, each of which surrounds at least one tooth from each set. The rotor has a plurality of circumferentially spaced teeth facing the stator teeth and a circumferential flywheel mass radially spaced from the rotational axis. The inertial energy storage device also includes a motor control circuit having sensor means for sensing the position of the rotor relative to the stator, and means responsive to the sensor means for generating a waveform for driving the machine when it is operating as a motor to provide the energy stored as inertial energy in the flywheel. A voltage control circuit controls the amplitude of the waveform and a current control circuit controls the amplitude of the current provided to the machine when it is operating as a motor.

Figure 1:
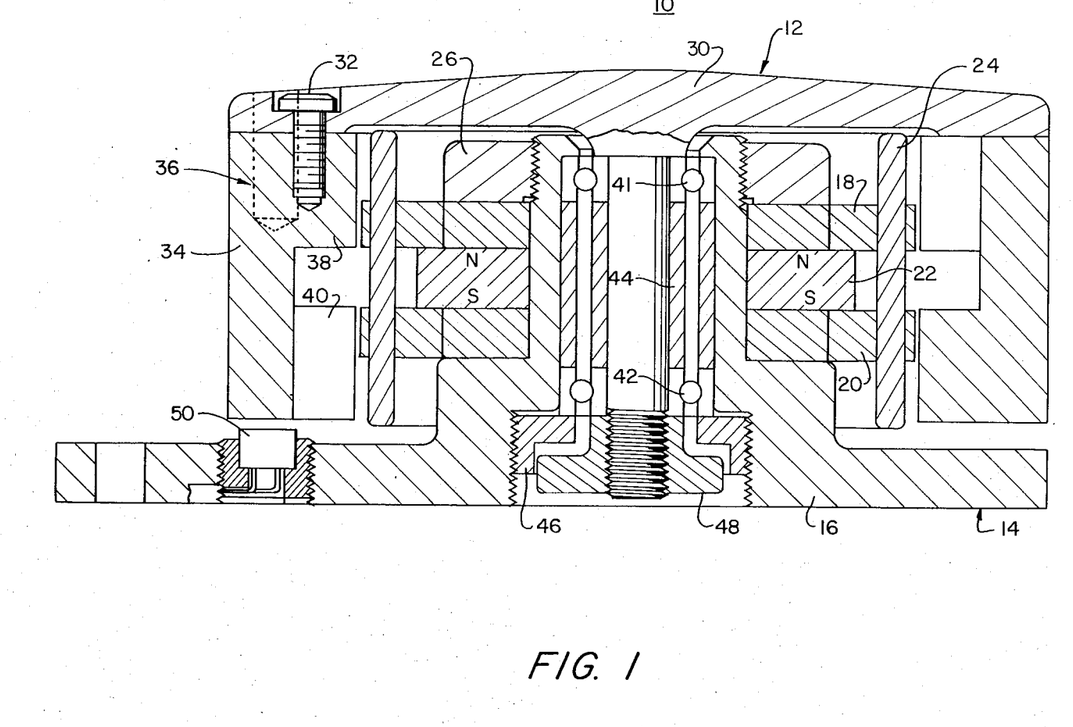
FIG. 1 is a sectional view along the central axis of a synchronous rotary electrical machine with a flywheel mass according to this invention.

There is shown in FIG. 1 a synchronous rotary electrical machine, motor/generator 10, having rotor 12 and stator 14. Stator 14 includes a stator mount 16 which carries two axially spaced sets of teeth 18,20, with a field excitation means, permanent magnet 22, between them. Winding assembly 24 is carried on sets of teeth 18 and 20, linking associated teeth in sets 18 and 20. Winding clamp 26, threadably engaged with stator mount 16, holds together teeth 18 and 20 with magnet 22 between them.

Rotor 12 includes a mounting stub shaft 30 having fixed to it, such as by screws 32, rotor shell 34, which contains a plurality of circumferentially spaced teeth 36 which in the embodiment of FIG. 1 are arranged in two axially spaced sets 38 and 40. Rotor 12 is a simple metal piece containing only sets of teeth 38 and 40, whereas windings 24 and permanent magnet 22 are on the stator where they will not be subject to centrifugal force. There are no windings on rotor 12 and so no commutators or brushes are needed. Rotor 12 is mounted for rotation with respect to stator 14 by means of bearings 41, 42, spaced apart by spacer 44 and held in position by stator retainer 46 and rotor retainer 48. Some means for sensing the relative position between stator 14 and rotor 12, such as a Hall device or photoelectric sensor 50, is provided on stator mounting 16. Alternatively, an electronic means of deducing the relative position between stator 14 and rotor 12 could be employed, either utilizing the stator terminal voltages and the current in the windings as inputs, or utilizing a separate winding on selected rotor teeth.

Figure 2:
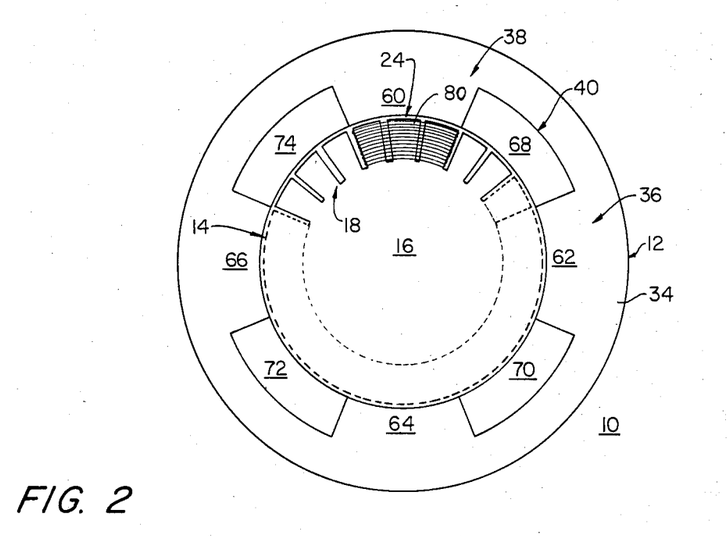
FIG. 2 is a schematic plan view of the machine of FIG. 1.

Motor/generator 10 is a three-phase, eight-pole machine and has eight rotor teeth 36, as shown in FIG. 2. There are four rotor teeth in each axially spaced set 38 and 40. Set 38 includes rotor teeth or poles 68, 70, 72, and 74, while set 40 includes rotor teeth or poles 60, 62, 64 and 66. The teeth in sets 38 and 40 are offset with respect to one another so that the four teeth 60, 62, 64 and 66, in set 40 do not cover teeth 68, 70, 72 and 74 of set 38. Cooperating with rotor teeth 36 are the two sets of stator teeth 18 and 20, which are not offset but are aligned with one another so that only set 18 is visible in FIG. 2. There are twenty-four teeth in each of sets 18 and 20, arranged so that each group of three such teeth in each set coincides with the face of a single pole or rotor tooth 36. In the three-phase design, each group of three stator teeth in set 18 and the three corresponding teeth in set 20 are surrounded by a single coil 80 of the stator winding 24.

Figure 3:
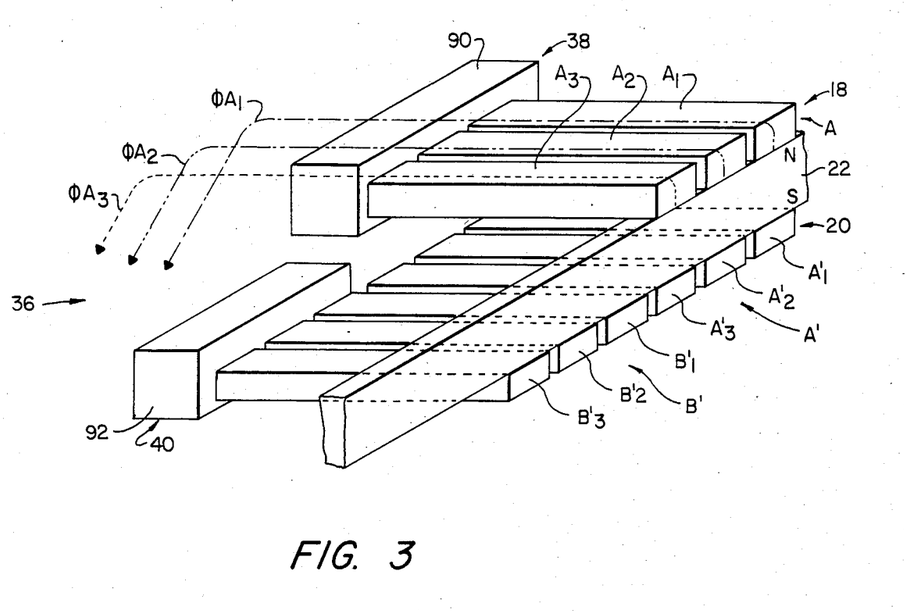
FIG. 3 is an axonometric view of a portion of the interface between the rotor teeth and stator teeth of the machine of FIG. 1, showing two sets of stator teeth aligned with each other.

The flux distribution for the three-phase, eight-pole machine shown in FIGS. 1 and 2 is illustrated in FIG. 3, where a first group A of three teeth, $A_1$, $A_2$, $A_3$, in set 18 are aligned with a rotor tooth or pole 90 in set 38. The corresponding group A' of three stator teeth $A'_1$, $A'_2$, and $A'_3$ in lower set 20 are not aligned with a lower rotor tooth in set 40, but are at a blank space. However, a second group B' of teeth $B'_1$, $B'_2$, $B'_3$ of lower stator teeth set 20 are aligned with a pole or rotor tooth 92 from lower rotor tooth set 40. The upper group of teeth B which should be positioned above group B' has been omitted for clarity. After the three fluxes, $\phi A_1$, $\phi A_2$, and $\phi A_3$, pass from the three stator teeth, $A_1$, $A_2$, and $A_3$, to rotor tooth (or pole) 90, the total flux splits (lines omitted for clarity) and half of it, namely $\phi A_3$ and $\frac{1}{2}\phi A_2$, extends through rotor tooth (or pole) 92. The other half, $\frac{1}{2}\phi A_2$ and $\phi A_1$, extends through the next rotor tooth to the right (not shown in FIG. 3). This component of flux returns to the stator through the next set of stator teeth to the right of $A'_1$, $A'_2$, and $A'_3$ (not shown in FIG. 3).

Figure 4:
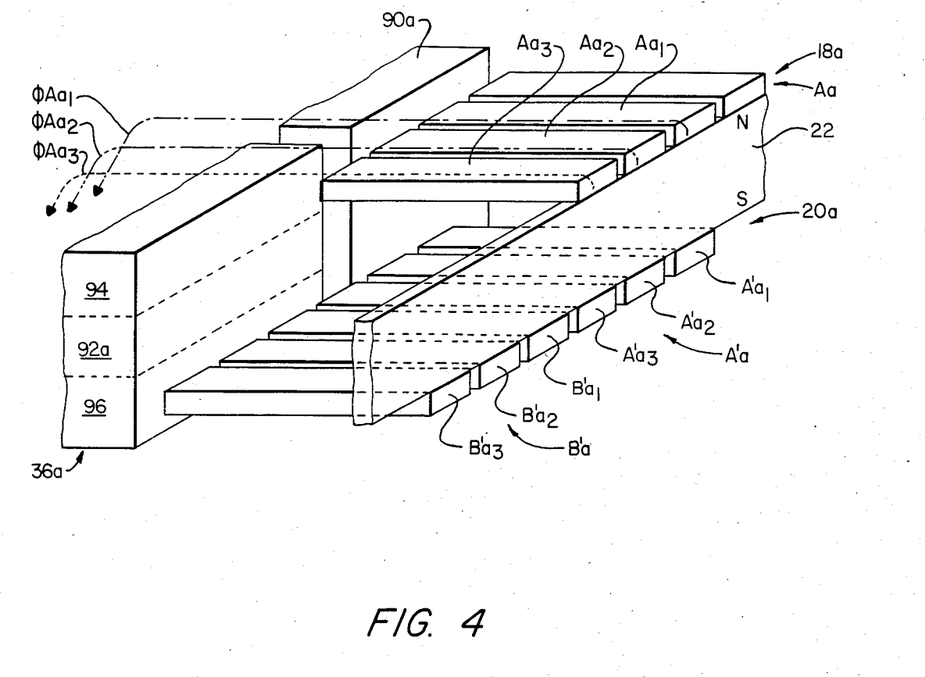
FIG. 4 is a view similar to FIG. 3 with the two sets of stator teeth circumferentially offset with respect to each other.

Similarly, half of the flux coming back from rotor tooth 92 to stator teeth $B'_1$ $B'_2$, and $B'_3$ comes from the next adjacent rotor tooth to the left of rotor tooth 90. In FIGS. 1, 2, and 3, the two sets of stator teeth 18 and 20 are axially aligned with each other while the two sets of rotor teeth 38 and 40 are offset with respect to one another, but this is not a necessary limitation of the invention. For example, as shown in FIG. 4, the teeth of set 18a are offset with respect to the teeth of set 20a. Thus teeth $Aa_1$, $Aa_2$, $Aa_3$ of group Aa are not aligned, but rather are offset with respect to teeth $A'a_1$, $A'a_2$, $A'a_3$ of group A'a. For the condition where the rotor teeth are axially in line as shown in FIG. 4, the corresponding sets of stator teeth must be displaced from each other by three teeth. The rotor tooth coverage of the windings is shown for axially staggered teeth in FIG. 5B and for axially aligned teeth in FIG. 5C. In general, the rotor teeth of one set may be shifted with respect to the other set by any angle as long as the stator teeth are shifted the same angle. In this case, with the stator teeth sets 18a and 20a, FIG. 4, offset with respect to each other, the rotor teeth sets are aligned with each other in each case to form a single large tooth 90a, 92a. Alternatively, each such tooth 92a may be broken into two teeth 94, 96, which are separated with a space between them, as indicated by the dashed lines, but which are aligned with each other. Flux paths $\phi Aa_1$, $\phi Aa_2$, and $\phi Aa_3$ follow a similar pattern to their analogs in FIG. 3.

Figure 5A:
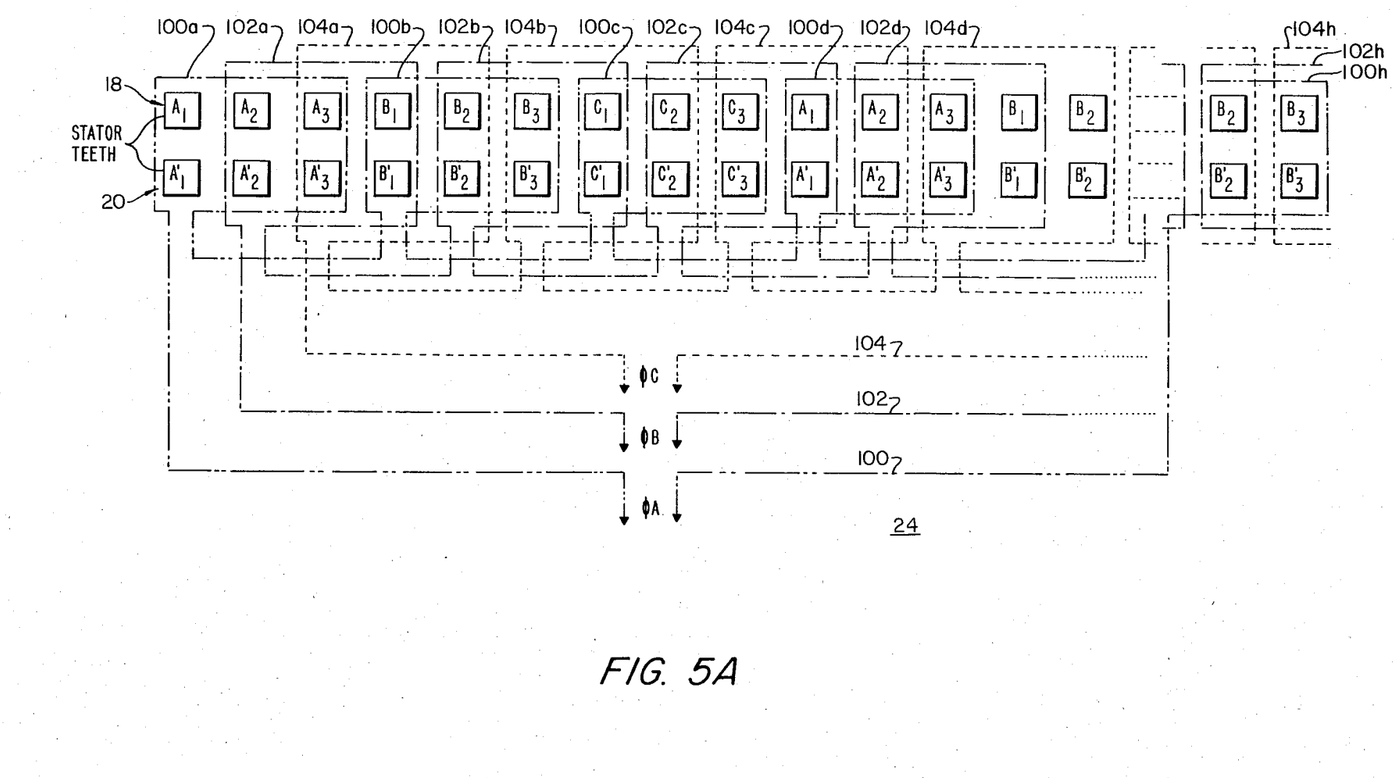
FIG. 5A is a schematic drawing of a three phase stator winding on the stator teeth of the machine of FIG. 1.
Figure 5B:
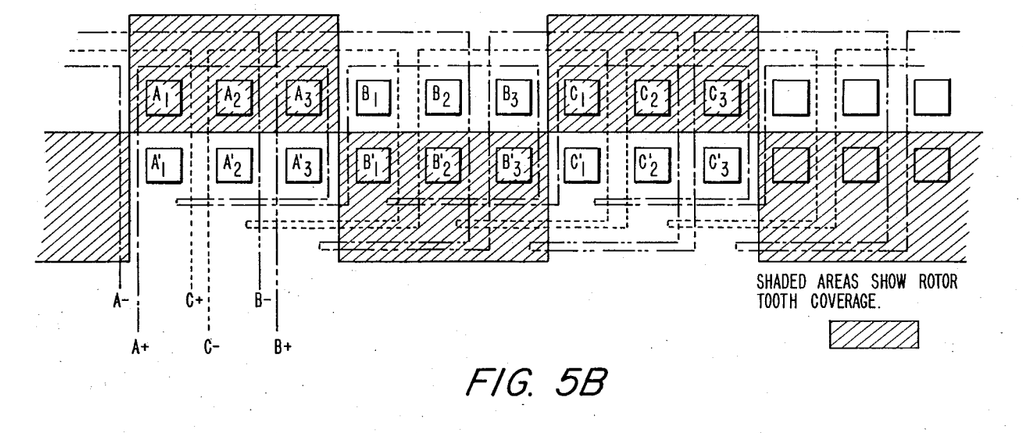
FIG. 5B is a drawing similar to FIG. 5A showing rotor teeth coverage for axially staggered teeth.
Figure 5C:
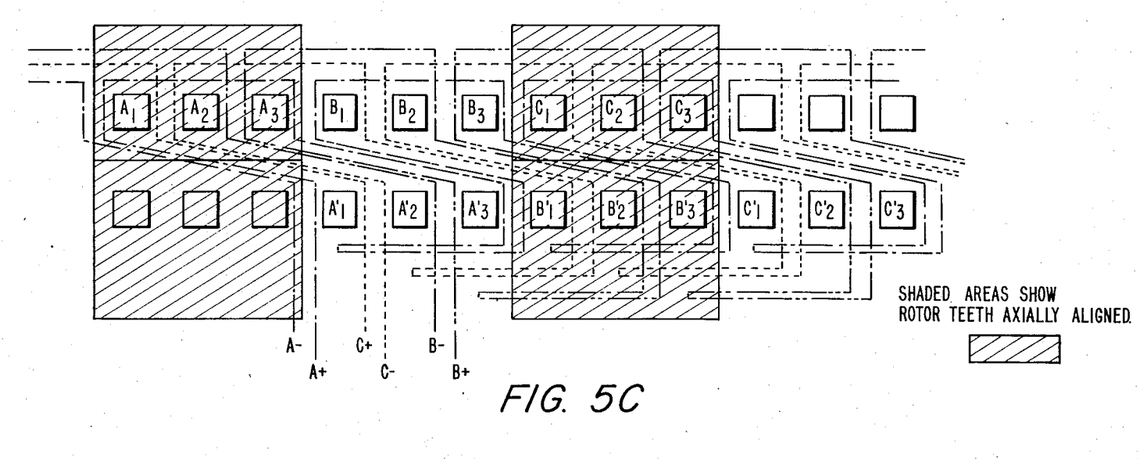
FIG. 5C is a drawing similar to FIG. 5A showing rotor teeth coverage for axially aligned teeth.

Stator winding 24, FIG. 5A, includes three separate windings 100, phase $\phi A$, 102, phase $\phi B$, and 104, phase $\phi C$. Each winding is made up of eight coils, each of which surrounds three upper stator teeth from set 18 and three lower stator teeth from set 20, FIGS. 1-3. Winding 100 includes coils 100a–h, winding 102 includes coils 102a–h, and winding 104 includes coils 104a–h.

Figure 6:
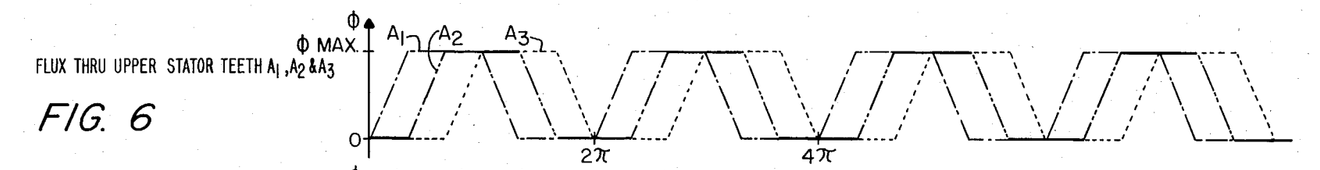
FIG. 6 is a graphical illustration of the flux through a group of three upper stator teeth.
Figure 7:
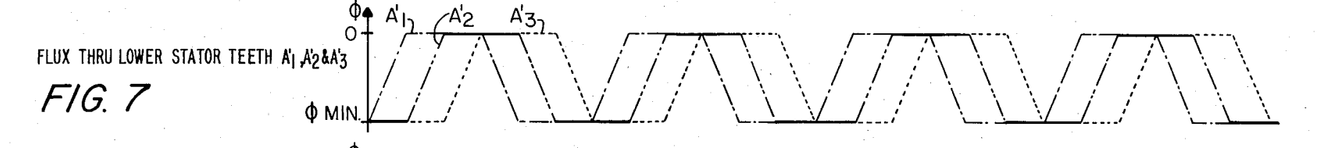
FIG. 7 is a graphical illustration of the flux through a group of three lower stator teeth.
Figure 8:
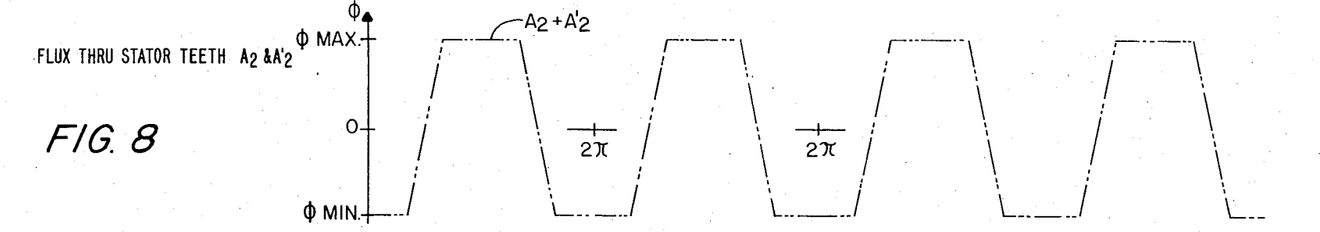
FIG. 8 is a graphical illustration of the flux through an upper stator tooth and a lower stator tooth.
Figure 9:
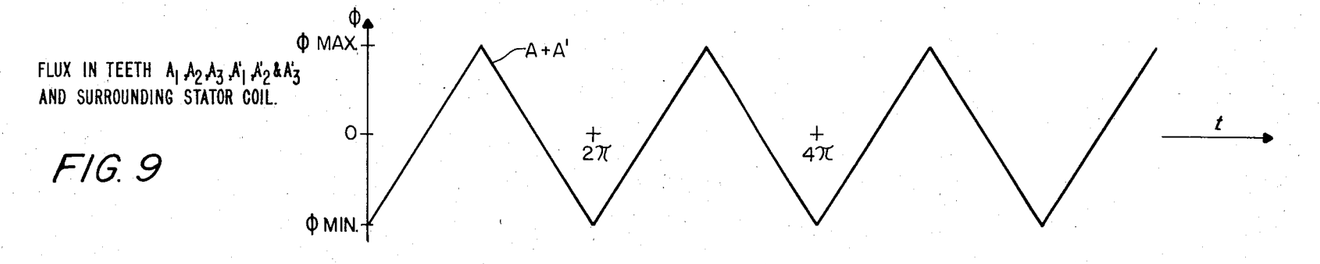
FIG. 9 is a graphical illustration of the combined flux of FIGS. 6 and 7 in a stator winding.
Figure 10:
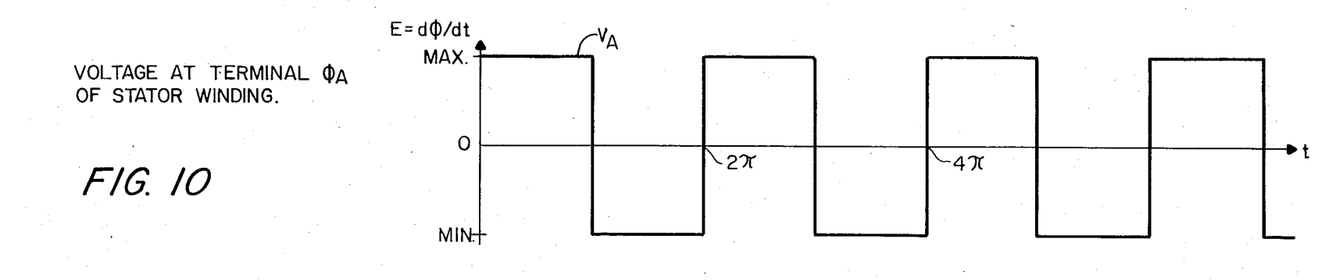
FIG. 10 is a graphical illustration of the voltage developed at the terminals of a stator winding having the flux depicted in FIG. 9.

The flux through each of the upper stator teeth $A_1$, $A_2$ and $A_3$ is shown in FIG. 6 in the form of three basically trapezoidal waves labelled $A_1$, $A_2$, and $A_3$, which vary between zero and $\phi_{max}$. Similarly, the flux through the associated lower stator teeth $A'_1$, $A'_2$ and $A'_3$ are illustrated in FIG. 7 by trapezoidal wave shapes $A'_1$, $A'_2$ and $A'_3$, which vary between zero and $\phi_{min}$. The combined flux through a pair of teeth $A_2$ and $A'_2$ is shown in FIG. 8 as a trapezoidal wave labelled $A_2 + A'_2$, which varies from $\phi_{min}$ to $\phi_{max}$. The combined flux in all of the groups A and A', that is teeth $A_1$, $A_2$, $A_3$, and $A'_1$, $A'_2$, $A'_3$, is also the flux encountered by a surrounding stator coil, and is shown in FIG. 9 as a triangular wave labelled A+A' which varies between minimum and maximum flux. The voltage at the terminals of the phase A stator winding is shown in FIG. 10 as a square wave $V_A$. With motor/generator 10 operating as a generator, $V_A$ is the voltage produced. With motor/generator 10 operating as a motor, this is the voltage that must be provided to the terminals to drive it as a motor.

Figure 11:
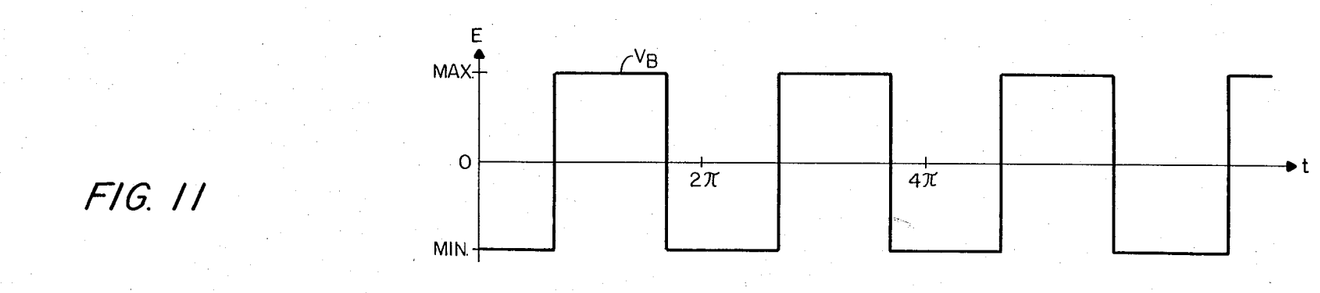
FIGS. 11 and 12 are graphical illustrations of the voltage at each of the two other stator winding terminals in a three phase system.
Figure 12:
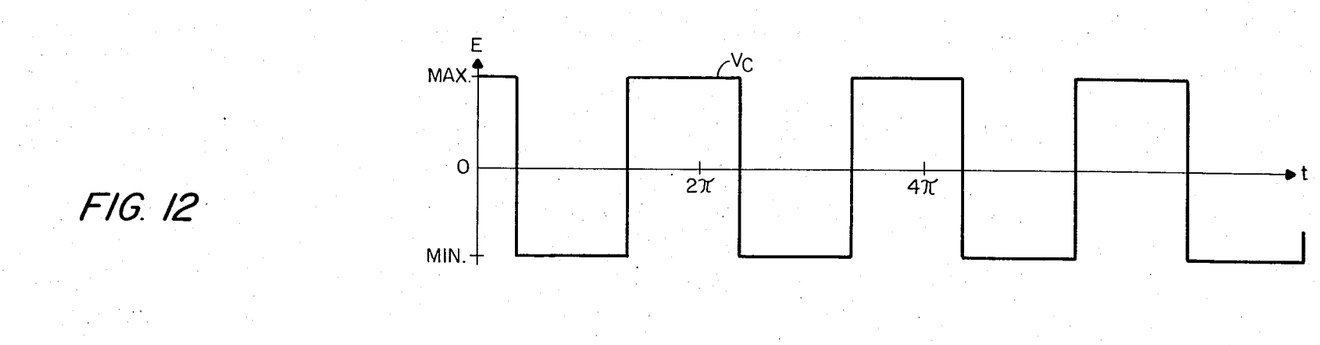

In a three-phase machine such as motor/generator 10, phases B and C appear as shown in FIGS. 11 and 12 indicated by the waveforms $V_B$ and $V_C$.

Figure 13:
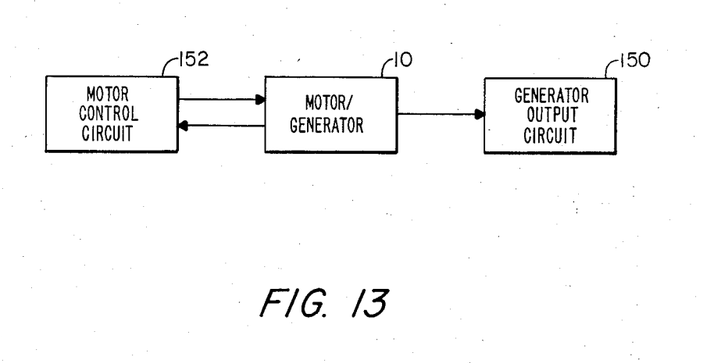
FIG. 13 is a block diagram of a rotary electrical machine according to this invention including a motor control circuit and generator output circuit.
Figure 14:
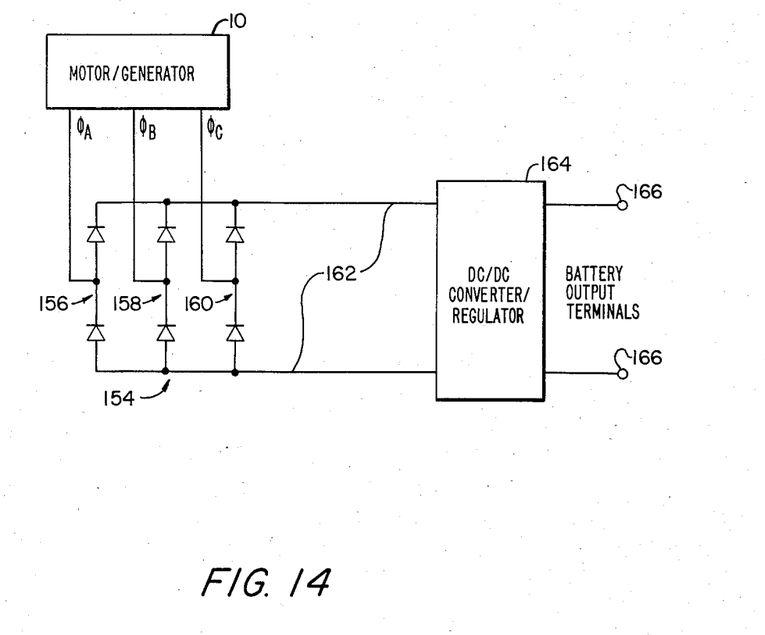
FIG. 14 is a more detailed block diagram of the generator output circuit of FIG. 13.

Motor/generator 10 may be associated with a generator output circuit 150 and/or motor control circuit 152, FIG. 13. Motor/generator 10 may first be driven as a motor through motor control circuit 152 until it reaches a constant speed, and a predetermined amount of energy is stored in rotor 12 which functions as a flywheel inertial mass. When power input ceases, motor/generator 10 switches to generator operation and provides the square wave output depicted in FIGS. 10, 11, 12. If that AC output is not desirable, it may be converted to DC by submitting the three-phase output from motor/generator 10 to three-phase rectifier 154, FIG. 14, which consists of three sets of diodes 156, 158, 160, which provide a DC output on line 162. This would be a varying DC output since the amplitude of the three-phase square wave output from motor/generator 10 varies in proportion to the speed of the rotor. The DC output on lines 162 may be converted to a fixed value such as would be delivered by a battery by using a DC to DC converter/regulator 164, which accepts the variable DC on lines 162 and provides a fixed DC at its output terminals 166.

Figure 15:
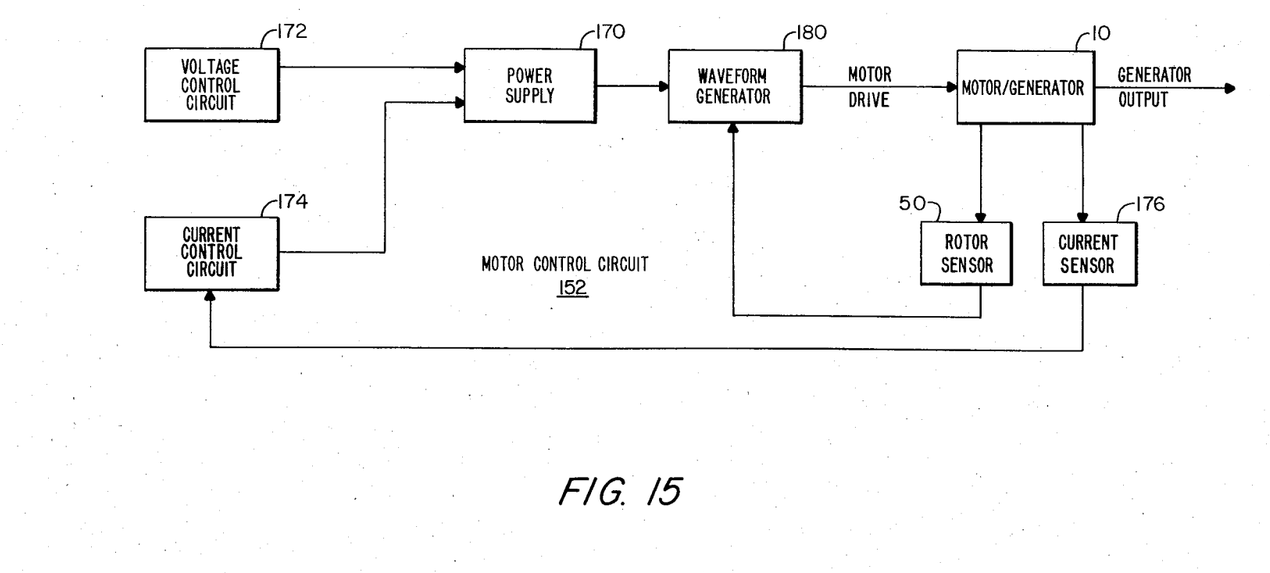
FIG. 15 is a more detailed block diagram of the motor control circuit of FIG. 13.

Motor control circuit 152 includes a variable power supply 170, FIG. 15, which is controlled by a voltage control circuit 172 and current control circuit 174. Current control circuit 174 responds to current sensor 176 to limit the amount of current provided by power supply 170 to motor/generator 10 during the period that the motor is accelerating to full speed. Voltage control circuit 172 controls the upper limits of the amplitude of the voltage applied by power supply 170 to motor/generator 10 when the motor has reached full speed. Waveform generator 180 responds to rotor sensor 50 to generate a drive waveform for motor/generator 10 in the motor mode of operation in response to the relative position of the rotor relative to the stator.

Figure 16:
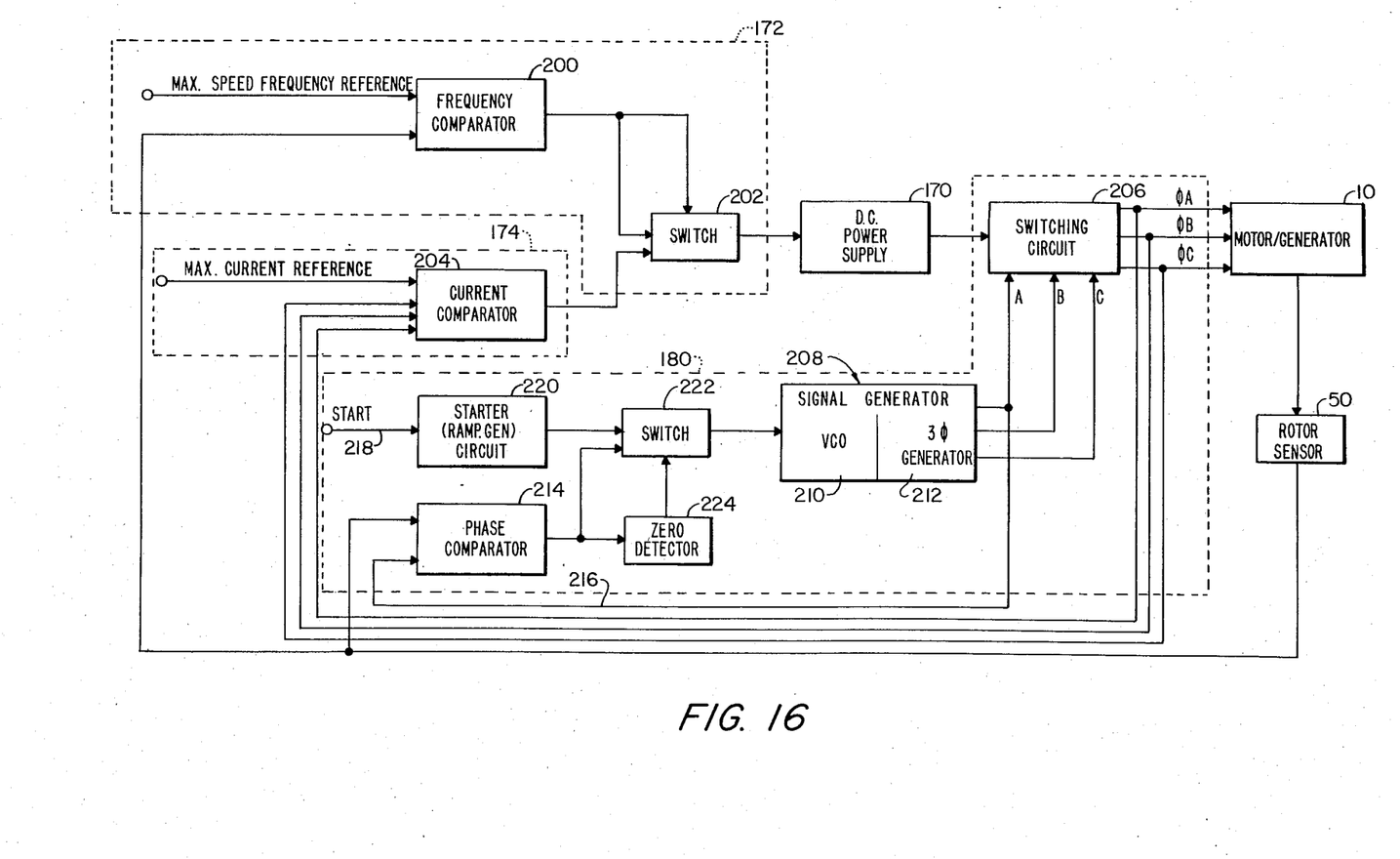
FIG. 16 is a more detailed diagram of the voltage control circuit, current control circuit and signal generator of FIG. 15.

Voltage control circuit 172 includes a frequency comparator 200, FIG. 16, one input to which is the maximum speed frequency reference, which is the frequency of motor generator 10 when it is operating at full speed. The other input to comparator 200 is the signal from rotor sensor 50, whose frequency will be compared with the reference frequency in comparator 200. Voltage control circuit 172 also includes switch 202 which, when provided with an output from comparator 200, indicating that the motor full speed has been reached, operates to provide the output of frequency comparator 200 to DC power supply 170 and disconnect the input thereto from current control circuit 174. Current control circuit 174 includes a current comparator 204, which has as one input a reference representing the maximum allowable current to be drawn by motor/generator 10. The other input to current comparator 204 derives from the current provided at each input phase to motor/generator 10. Waveform generator 180 includes switching circuit 206, which chops the DC from DC power supply 170 to provide three phase signals, $\phi A$, $\phi B$, $\phi C$, to three-phase motor/generator 10 operating as a motor. Switching circuit 206 is driven to switch at the proper time and sequence by signal generator 208, which includes voltage control oscillator 210 and three-phase generator 212.

Three-phase generator 212 varies three output signals A, B, and C, from which are derived the three phase inputs $\phi A$, $\phi B$, and $\phi C$. Three-phase generator 212 varies the frequencies of signals A, B, and C in response to variations in the frequency from the voltage control oscillator 210, which varies its output in response to an input signal voltage indicative of the desired switching to be performed by switching circuit 206. Phase comparator 214 compares the actual phase relationship of the rotor and stator, as indicated by rotor sensor 50, with the correction signal provided by signal generator 208, for example, by using signal A on feedback line 216.

Initially, when the motor is not in motion, a start signal on line 218 to starter circuit 220, which may be a ramp generator, causes an output to be delivered through switch 222 to signal generator 208. That output is formed into three-phase outputs A, B, and C, whose frequency will be directly proportional to the amplitude of the input signal from starter circuit 220. Switching circuit 206 immediately begins to chop the DC from power supply 170 and deliver it to motor generator 10 so that the motor rotor begins to rotate. When zero detector circuit 224 determines that the signal from rotor sensor 50 is equal to the signal fed back on line 216, then detector 224 operates switch 222 to disconnect starter 220 from signal generator 208 and replace it with the output from phase comparator 214. With the motor accelerating, phase comparator 214 constantly provides a signal through switch 222, whose amplitude drives VCO 210 to increase the frequency of signals A, B, and C to switching circuit 206. This in turn increases the frequency of waveforms being provided at $\phi A$, $\phi B$ and $\phi C$ to motor generator 10, driving the rotor to move at still higher speeds. During this period, current comparator 204 monitors the current being supplied by DC power supply 170, to insure that it does not exceed predetermined safe limits for motor/generator 10. When the frequency of the signal from rotor sensor 50 equals the frequency at maximum motor speed, frequency comparator 200 operates switch 202 to disconnect current comparator 204 from the input to DC power supply 170 and replace it with the output of frequency comparator 200, which will now limit the maximum voltage provided by DC power supply 170 to that coinciding with the operation of motor/generator 10 at its maximum speed.

Figure 17:
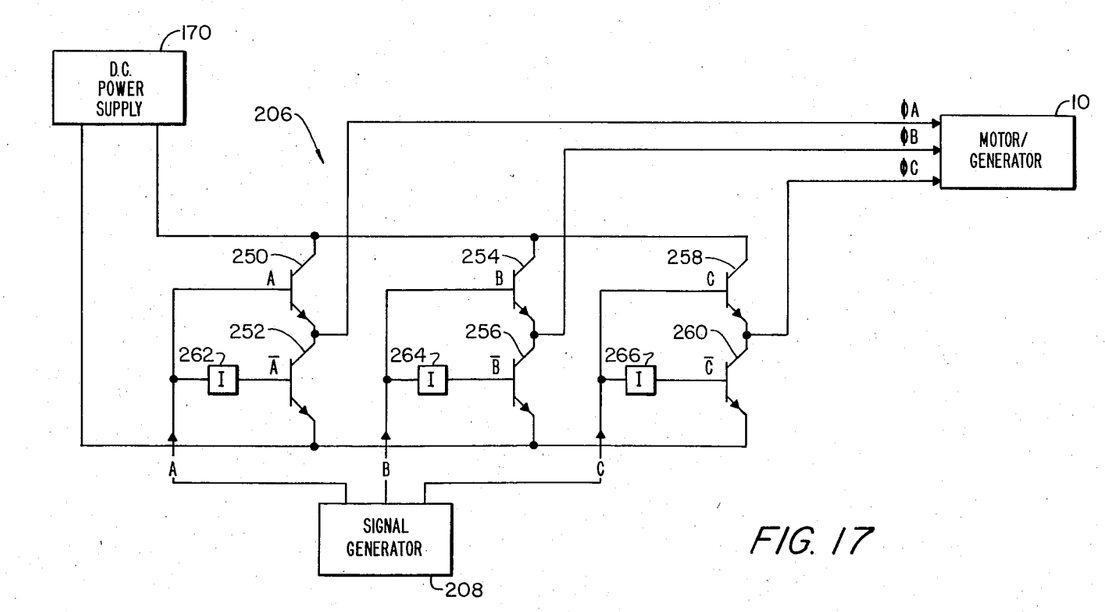
FIG. 17 is a more detailed block diagram of the switching circuit of FIG. 16.

Switching circuit 206 includes three pairs of transistors 250, 252; 254, 256; 258, 260; FIG. 17, connected across the output of DC power supply 170. Transistors 250, 254 and 258 have their bases driven directly by signals A, B and C, respectively, while the bases of transistors 252, 256 and 260 are driven by signals $\overline{A}$, $\overline{B}$, and $\overline{C}$ after inversion by inverter circuits 262, 264 and 266, respectively. The switched output from the collector emitter junction of each of the pairs of transistors driven by the A, $\overline{A}$, B, $\overline{B}$, C, $\overline{C}$ signals, provide the $\phi A$, $\phi B$, $\phi C$ phase signals to drive motor/generator 10 in the motor mode.

Other embodiments will occur to those skilled in the art and are within the following claims:

What is claimed is:

1. A synchronous rotary electrical machine for bidirectional conversion between mechanical and electrical energy comprising:
    a stator having two axially spaced sets of circumferentially spaced teeth;
    axially polarized field excitation means disposed on said stator to provide an axially polarized magnetic field;
    a rotor having a plurality of circumferentially spaced magnetic poles facing said stator teeth and magnetic means interconnecting adjacent rotor poles; and
    stator windings distinct from said field excitation means and including a plurality of coils, each of which surrounds, from one of said sets, at least one tooth which is covered by a rotor pole and, from the other of said sets, at least one tooth which is not simultaneously covered by a pole.

2. The machine of claim 1 in which said rotor is external to said stator.

3. The machine of claim 1 in which said rotor includes a circumferential flywheel mass radially spaced from its rotational axis.

4. The machine of claim 1 in which said field excitation means includes a permanent magnet.

5. The machine of claim 1 in which said field excitation means is disposed on said stator between said sets of teeth.

6. The machine of claim 1 in which the teeth of one of said sets of teeth on said stator are offset with respect to the teeth on the other set on said stator.

7. The machine of claim 1 in which said plurality of teeth on said rotor includes two axially spaced sets of circumferentially spaced teeth.

8. The machine of claim 1 in which the teeth of one of said sets of teeth on said rotor are offset with respect to the teeth on the other set on said rotor.

9. The machine of claim 1 further including rectifier means for converting an a.c. output of said stator windings to d.c. when said machine is operated as a generator.

10. The machine of claim 1 further including a motor control circuit including sensor means for sensing the position of said rotor relative to said stator and means, responsive to said sensor means, for generating a waveform for driving said machine when it is operating as a motor.

11. The machine of claim 10 in which said motor control circuit further includes a voltage control circuit for controlling the amplitude of said waveform for driving said machine.

12. The machine of claim 11 in which said voltage control circuit includes a frequency detector circuit for comparing the frequency of the output from said sensor means with the maximum frequency of said machine and providing a signal indicative thereof to adjust the amplitude of the input to said machine.

13. The machine of claim 10 in which said motor control circuit further includes a current control circuit for controlling the amplitude of the current provided to said machine.

14. The machine of claim 13 in which said current control circuit includes current sensor means for sensing the current flowing in said stator windings and means, responsive to said current sensor means, for adjusting the current supplied to said machine.

15. The machine of claim 10 in which said sensor means includes an optical sensor.

16. The machine of claim 10 in which said means for generating a waveform includes a signal generator and a phase detector, responsive to said sensor means and said signal generator, for keeping said signal generator output in phase with the output from said sensor means.

17. The machine of claim 16 in which said signal generator includes a voltage controlled oscillator.

18. The machine of claim 16 in which said means for generating a waveform includes a switching circuit driven by the output of said signal generator.

19. The machine of claim 16 in which said means for generating a waveform includes a starter circuit for initially driving said signal generator; switching means for supplying the input of said signal generator an output from one of said starter circuit and said phase detector; and detector means for operating said switching means to connect said phase detector to said signal generator and disconnect said starter circuit when said phase detector first detects a phase null.

20. The device of claim 1 in which said rotor includes a pair of axial spaced sets of said poles.

21. The device of claim 20 in which said poles in one set are offset with respect to said poles in the other set.

22. The device of claim 1 in which said teeth in one of said axially spaced sets are aligned with those in the other said set.

23. A synchronous rotary electrical machine for bidirectional conversion between mechanical and electrical energy comprising:
- a stator having two axially spaced sets of circumferentially spaced teeth;
- axially polarized field excitation means disposed on said stator to provide an axially polarized magnetic field;
- a rotor having a plurality of circumferentially spaced magnetic poles facing said stator teeth and magnetic means interconnecting adjacent rotor poles;
- stator windings distinct from said field excitation means and including a plurality of coils, each of which surrounds, from one of said sets, at least one tooth which is covered by a rotor poles and, from the other of said sets, at least one tooth which is not simultaneously covered by a pole; and
- a motor control circuit including sensor means for sensing the position of said rotor relative to said stator; means, responsive to said sensor means, for generating waveform for driving said machine when it is operating as a motor; a voltage control circuit for controlling the amplitude of said waveform for driving said machine; said voltage control circuit including a frequency detector circuit for comparing the frequency of the output from said sensor means with a maximum frequency of said machine and providing a signal indicative thereof to adjust the amplitude of the input to the machine.

24. The machine of claim 23 in which said motor control circuit further includes a current control circuit for controlling the amplitude of the current provided to said machine.

25. The machine of claim 24 in which said current control circuit includes current sensor means for sensing the current flowing in said stator windings and means, responsive to said current sensor means, for adjusting the current supplied to said machine.

26. The machine of claim 23 in which said sensor means includes an optical sensor.

27. the machine of claim 23 in which said means for generating a waveform includes a signal generator and a phase detector, responsive to said sensor means and said signal generator, for keeping said signal generator output in phase with the output from said sensor means.

28. The machine of claim 27 in which said signal generator includes a voltage controlled oscillator.

29. The machine of claim 27 in which said means for generating a waveform includes a switching circuit driven by the output of said signal generator.

30. The machine of claim 27 in which said means for generating a waveform includes a starter circuit for initially driving said signal generator; switching means for supplying the input of said signal generator an output from one of said starter circuit and said phase detector circuit; and detector means for operating said switching means to connect said phase detector to said signal generator and disconnect said starter circuit when said phase detector first detects a phase null.

31. A motor control circuit for a synchronous rotary electrical machine having a rotor and a stator, comprising:
- means for sensing the position of the rotor relative to the stator;
- means, responsive to said sensing means, for generating a waveform for driving said machine as a motor;
- a voltage control circuit for controlling the amplitude of said waveform for driving said machine; and
- a current control circuit for controlling amplitude of the current provided to said machine; said means for generating a waveform including a signal generator, a phase detector, responsive to said sensing means and said signal generator, for keeping said signal generator output in phase with the output from said sensing means, a starter circuit for initially driving said signal generator, switching means for supplying the input of said signal generator with output from one of said starter circuit and said phase detector, and detector means for operating said switching means to connect said phase detector to said signal generator and disconnect said starter circuit when said phase detector first detects a phase null.

32. The machine of claim 31 in which said motor control circuit further includes a voltage control circuit for controlling the amplitude of said waveform for driving said machine.

33. The machine of claim 32 in which said voltage control circuit includes a frequency detector circuit for comparing the frequency of the output from said sensing means with the maximum frequency of said machine and providing a signal indicative thereof to adjust the amplitude of the input to said machine.

34. The machine of claim 31 in which said sensing means includes an optical sensor.

35. The machine of claim 31 in which said signal generator includes a voltage controlled oscillator.

36. The machine of claim 31 in which said means for generating a waveform includes a switching circuit driven by the output of said signal generator.

37. The machine of claim 31 in which said current control circuit includes current sensor means for sensing the current flow in said stator windings and means, responsive to said current sensor means, for adjusting the current supplied to said machine.

38. An inertial storage device comprising:
   a synchronous rotary electrical machine for bidirectional conversion between mechanical and electrical energy, including a stator having two axially spaced sets of circumferentially spaced teeth; field excitation means disposed on said stator to provide an axially polarized magnetic field; stator windings including a plurality of coils, each of which surrounds at least one tooth from each set; and a rotor having a plurality of circumferentially spaced teeth facing said stator teeth and a circumferential flywheel mass radially spaced from its rotational axis; and
   a motor control circuit including sensor means for sensing the position of said rotor relative to said stator; means, responsive to said sensor means, for generating a waveform for driving said machine when it is operating as a motor; a voltage control circuit for controlling the amplitude of said waveform for driving said machine; and a current control circuit for controlling amplitude of the current provided to said machine; said means for generating a waveform including a signal generator, a phase detector, responsive to said sensor means and said signal generator, for keeping said signal generator output in phase with the output from said sensor means, a starter circuit for initially driving said signal generator, switching means for supplying the input of said signal generator with output from one of said starter circuit and said phase detector circuit, and detector means for operating said switching means to connect said phase detector to said signal generator and disconnect said starter circuit when said phase detector first detects a phase null.

39. A motor control circuit for generating a waveform for driving a synchronous rotary electrical machine having a stator including two axially spaced sets of circumferentially spaced teeth, field excitation means on said stator, stator windings including a plurality of coils each of which surrounds at least one tooth from each set and rotor having a plurality of circumferentially spaced teeth, and means for sensing the position of the rotor relative to the stator, the circuit comprising:
   means, responsive to said sensing means, for generating a waveform for driving said machine as a rotor;
   a voltage control circuit for controlling the amplitude of said waveform for driving said machine;
   a current control circuit for controlling amplitude of the current provided to said machine; said means for generating a waveform including a signal generator, a phase detector, responsive to said sensing means and said signal generator, for keeping said signal generator output in phase with the output from said sensing means, a starter circuit for initially driving said signal generator, switching means for supplying the input of said signal generator with output from one of said starter circuit and said phase detector, and detector means for operating said switching means to connect said phase detector to said signal generator and disconnect said starter circuit when said phase detector first detects a phase null.

40. A synchronous rotary electrical machine for bidirectional conversion between mechanical and electrical energy comprising:
   a stator having two axially spaced sets of circumferentially spaced teeth;
   field excitation means disposed on said stator to provide an axially polarized magnetic field;
   stator windings including a plurality of coils, each of which surrounds at least one tooth from each set;
   a rotor having a plurality of circumferentially spaced teeth facing said stator teeth; and
   a motor control circuit including means for sensing the position of said rotor relative to said stator and means, responsive to said sensing means, for generating a waveform for driving said machine when it is operating as a motor, said means for generating a waveform including voltage controlled oscillator and a phase detector, responsive to said sensing means and said voltage controlled oscillator, for keeping said voltage controlled oscillator output in phase with the output from said sensing means.

41. A synchronous rotary electrical machine for bidirectional conversion between mechanical and electrical energy comprising:
   a stator having two axially spaced sets of circumferentially spaced teeth;
   field excitation means disposed on said stator to provide an axially polarized magnetic field;
   stator windings including a plurality of coils, each of which surrounds at least one tooth from each set;
   a rotor having a plurality of circumferentially spaced teeth facing said stator teeth; and
   a motor control circuit including means for sensing the position of said rotor relative to said stator and means, responsive to said sensing means, for generating a waveform for driving said machine when it is operating as a motor, said means for generating a waveform including a signal generator and a phase detector, responsive to said sensoring means and said signal generator, for keeping said signal generator output in phase with the output from said sensing means, said means for generating a waveform including a starter circuit for initially driving said signal generator, switching means for supplying the input of said signal generator an output from one of said starter circuit and said phase detector, and detector means for operating said switching means to connect said phase detector to said signal generator and disconnect said starter circuit when said phase detector first detects a phase null.

42. A synchronous rotary electrical machine for bidirectional conversion between mechanical and electrical energy comprising:
   a stator having two axially spaced sets of circumferentially spaced teeth;
   field excitation means disposed on said stator to provide an axially polarized magnetic field;
   stator windings including a plurality of coils, each of which surrounds at least one tooth from each set;
   a rotor having a plurality of circumferentially spaced teeth facing said stator teeth; and
   a motor control circuit including means for sensing the position of said rotor relative to said stator; means, responsive to said sensing means, for generating a waveform for driving said machine when it is operating as a motor; a voltage control circuit for controlling the amplitude of said waveform for driving said machine; said voltage control circuit including a frequency detector circuit for comparing the frequency of the output from said sensing means with a maximum frequency of said machine and providing a signal indicative thereof to adjust the amplitude of the input to the machine, said means for generating a waveform including a voltage controlled oscillator and a phase detector, responsive to said sensing means and said voltage controlled oscillator for keeping said signal generator output in phase with the output from said sensing means.

43. A synchronous rotary electrical machine for bidirectional conversion between mechanical and electrical energy comprising:
    a stator having two axially spaced sets of circumferentially spaced teeth;
    field excitation means disposed on said stator to provide an axially polarized magnetic field;
    stator windings including a plurality of coils, each of which surrounds at least one tooth from each set;
    a rotor having a plurality of circumferentially spaced teeth facing said stator teeth; and
    a motor control circuit including means for sensing the position of said rotor relative to said stator; means, responsive to said sensing means, for generating a waveform for driving said machine when it is operating as a motor, a voltage control circuit for controlling the amplitude of said waveform for driving said machine, said voltage control circuit including a frequency detector circuit for comparing the frequency of the output from said sensing means with a maximum frequency of said machine and providing a signal indicative thereof to adjust the amplitude of the input to the machine, said means for generating a waveform including a signal generator, a phase detector, responsive to said sensing means and said signal generator, for keeping said signal generator output in phase with the output from said sensing means, a starter circuit for initially driving said signal generator, switching means for supplying the input of said signal generator an output from one of said starter circuit and said phase detector and detector means for operating said switching means to connect said phase detector to said signal generator and disconnect said starter circuit when said phase detector first detects a phase null.

44. An inertial energy storage device comprising:
    a synchronous rotary electrical machine for bidirectional conversion between mechanical and electrical energy including a stator having two axially spaced sets of circumferentially spaced teeth;
    axially polarized field excitation means disposed on said stator to provide an axially polarized magnetic field;
    a rotor having a plurality of circumferentially spaced magnetic poles facing said stator teeth and magnetic means interconnecting adjacent rotor poles;
    stator windings distinct from said field excitation means and including a plurality of coils, each of which surrounds, from one of said sets, at least one tooth which is covered by a rotor pole and, from the other of said sets, at least one tooth which is not simultaneously covered by a pole; and
    a motor control circuit including sensor means for sensing the position of said rotor relative to said stator; and means, responsive to said sensor means, for generating a waveform for driving said machine when it is operating as a motor.

45. A synchronous rotary electrical machine for bidirectional conversion between mechanical and electrical energy comprising:
    a stator having two axially spaced sets of circumferentially spaced teeth, the teeth in one set being aligned with those in the other set;
    axially polarized field excitation means disposed on said stator to provide an axially polarized magnetic field;
    a rotor having a plurality of circumferentially spaced magnetic poles facing said stator teeth and magnetic means interconnecting adjacent rotor poles; and
    stator windings distinct from said field excitation means and including a plurality of coils, each of which surrounds, from one of said sets, at least one tooth which is covered by a rotor pole and, from the other of said sets, at least one tooth which is not simultaneously covered by a pole.

46. A synchronous rotary electrical machine for bidirectional conversion between mechanical and electrical energy comprising:
    a stator having two axially spaced sets of circumferentially spaced teeth, the teeth in one set being offset from those in the other set;
    axially polarized field excitation means disposed on said stator to provide an axially polarized magnetic field;
    a rotor having a plurality of circumferentially spaced magnetic poles facing said stator teeth and magnetic means interconnecting adjacent rotor poles; and
    stator windings distinct from said field excitation means and including a plurality of coils, each of which surrounds, from one of said sets, at least one tooth which is covered by a rotor pole and, from the other of said sets, at least one tooth which is not simultaneously covered by a pole.

47. A synchronous rotary electrical machine for bidirectional conversion between mechanical and electrical energy comprising:
    a stator having two axially spaced sets of circumferentially spaced teeth;
    axially polarized field excitation means disposed on said stator to provide an axially polarized magnetic field;
    a rotor having a plurality of circumferentially spaced magnetic poles facing said stator teeth and magnetic means interconnecting adjacent rotor poles;
    stator windings distinct from said field excitation means and including a plurality of coils, each of which surrounds, from one of said sets, at least one tooth which is covered by a rotor pole and, from the other of said sets, at least one tooth which is not simultaneously covered by a pole;
    a motor control circuit including sensor means for sensing the position of said rotor relative to said stator; and
    means, responsive to said sensor means, for generating a waveform for driving said machine when it is operating as a motor.

* * * * *